No. 623,459.　　　　　　　　　　　　　　　　　Patented Apr. 18, 1899.
A. V. P. M. BERTHIER.
BREECH BOLT FOR FIREARMS.
(Application filed Feb. 8, 1898.)
(No Model.)
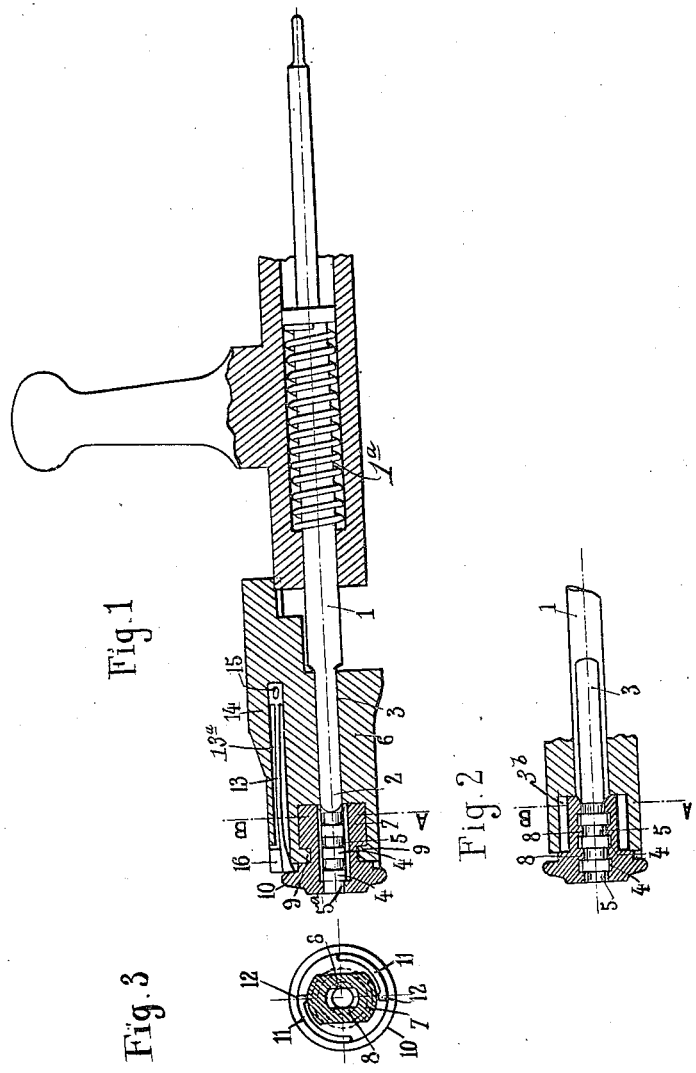
Witnesses
Geo. E. Sullivan
Philip V. Tilden
Inventor
Andre V. P. M. Berthier,
By James L. Norris
Atty
THE NORRIS PETERS CO., PHOTO-LITHO., WASHINGTON, D. C.

UNITED STATES PATENT OFFICE.

ANDRÉ VIRGILE PAUL MARIE BERTHIER, OF PARIS, FRANCE.

BREECH-BOLT FOR FIREARMS.

SPECIFICATION forming part of Letters Patent No. 623,459, dated April 18, 1899.

Application filed February 8, 1898. Serial No. 669,533. (No model.)

*To all whom it may concern:*

Be it known that I, ANDRÉ VIRGILE PAUL MARIE BERTHIER, a citizen of France, residing at Paris, in the Department of the Seine, France, have invented certain new and useful Improvements in Magazine or Repeating Rifles, of which the following is a specification.

My invention relates to improvements in magazine or repeating firearms.

The invention has for its object improvement in the means for connecting the firing-pin to the cocking-piece, whereby these parts may be readily assembled or disconnected.

In order to enable others skilled in the art to which my invention appertains to understand the same, I have illustrated the invention in the accompanying drawings, in which—

Figure 1 is a longitudinal section through the breech-bolt and cocking-piece, showing the firing-pin in position, the frame and other parts mounted therein to coöperate with the firing-pin and cocking-piece not being shown, as they form no part of my invention. Fig. 2 is also a longitudinal section of a portion of the same, but taken on a plane at right angles to that of Fig. 1; and Fig. 3 is a section through the cocking-piece on the line A B of Figs. 1 and 2.

The numeral 1 indicates the firing-pin, which as to its forward portion is of the usual construction and is actuated by a spring $1^a$. In its rear portion 2 the firing-pin is provided with opposite flattened sides 3, this non-circular portion of the firing-pin being inserted in a correspondingly-shaped longitudinal passage $3^a$, extending through the cocking-piece and frictionally engaging the walls thereof, so that lateral or rotary movement of the firing-pin within the cocking-piece is prevented. In the rear end of the cocking-piece is provided a circular recess $3^b$, from the opposite side of which extend projections 9 in a direction toward each other and across the opening of said recess. Revolubly mounted in said recess is a sleeve 7, which is of the shape shown in Fig. 3—that is, it has two opposite circular and two opposite flat sides. The circular sides of said sleeve are each provided with a peripheral groove which is designed to receive the projection 9, said grooves being brought into engagement with the projections 9 by giving said sleeve a quarter-turn. Similarly by imparting a further turn to the sleeve 7 the flat sides thereof may be brought opposite the projections 9 and the sleeve be removed from the cocking-piece. Extending through the sleeve 7 is a passage $5^a$, which alines with the passage $3^b$ in the cocking-piece. The rear end of the firing-pin beyond the non-circular portion 2 projects into the passage $5^a$ and on opposite sides is provided with projections 4, affording between them grooves 5. On opposite sides of the passage $5^a$ are provided projections 8, which are designed to be received into the grooves 5 and afford between them slots designed to receive the projections 4 on the firing-pin, as clearly shown in Fig. 2. The grooves and projections just described are respectively brought into engagement by revolving the sleeve 7. As the firing-pin cannot turn, it is obvious that a quarter-turn of the sleeve 7 will operate to lock the sleeve in engagement with the cocking-piece and also with the firing-pin and that a corresponding turn of the sleeve will serve to disengage these parts.

The numeral 10 indicates a knob on the sleeve 7 for turning same. In order to maintain the sleeve in the position to which it is turned to lock the parts in engagement, as just described, this knob is provided on its inner side with oppositely-located grooves 11 11, each of which extends a quarter-way around the knob, as shown in Fig. 3, and has at its end a recess 12, in the one or the other of which takes the free end of a leaf-spring 13, which is located in a recess $13^a$, formed in an upper reinforced part 14 of the cocking-piece 6 and held therein at one end by a screw 15. The spring is provided at its outer free end with a head 16, so shaped as to close the opening to the recess $13^a$ to prevent the entrance of foreign matter. In turning the sleeve 7 the free end of the spring rides on one or the other of the grooves 11, as will be understood, until a recess 12 is reached, when it will snap into said recess and prevent the sleeve from turning in the ordinary operation of the parts.

Having thus described my invention, what I claim as new is—

In firearms, a cocking-piece having a longitudinal non-circular passage extending therethrough and at its outer end a recess, and having oppositely-located projections in the opening of said recess, a sleeve revolubly mounted in said recess and having two opposite flat and two opposite circular sides said circular sides having grooves engaging with said projections, a firing-pin having a non-circular portion fitted in the non-circular passage of the cocking-piece and having its outer end located in a passage formed in said sleeve and provided on opposite sides with spaced projections, spaced projections formed on opposite sides of the passage of the sleeve and designed to interlock both those of the firing-pin, and means for holding the parts described in their interlocked positions, substantially as described.

In testimony whereof I have hereunto set my hand in presence of two subscribing witnesses.

ANDRÉ VIRGILE PAUL MARIE BERTHIER.

Witnesses:
EDWARD P. MACLEAN,
HIPPOLYTE TOSSE.